(12) United States Patent
Weinstein et al.

(10) Patent No.: US 9,473,635 B2
(45) Date of Patent: *Oct. 18, 2016

(54) METHOD AND SYSTEM FOR MANAGING INTERACTIVE COMMUNICATIONS CAMPAIGNS

(71) Applicant: Soundbite Communications, Inc., Bedford, MA (US)

(72) Inventors: Damon Weinstein, Arlington, MA (US); Timothy R. Segall, Lexington, MA (US); Vincent E. Laiosa, Lexington, MA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,331

(22) Filed: Dec. 21, 2015

(65) Prior Publication Data
US 2016/0105560 A1    Apr. 14, 2016

Related U.S. Application Data (63) Continuation of application No. 14/678,893, filed on Apr. 3, 2015, now Pat. No. 9,219,817, which is a continuation of application No. 13/769,417, filed on Feb. 18, 2013, now abandoned, which is a continuation of application No. 11/336,151, filed on Jan. 21, 2006, now Pat. No. 8,379,834.

(51) Int. Cl.
*H04M 3/00* (2006.01)
*H04M 5/00* (2006.01)
*H04M 3/51* (2006.01)
(Continued)

(52) U.S. Cl.
CPC ........... *H04M 3/5175* (2013.01); *H04M 3/493* (2013.01); *H04M 3/5166* (2013.01); *H04M 3/5191* (2013.01); *H04M 3/523* (2013.01); *H04M 3/5158* (2013.01)

(58) Field of Classification Search
CPC ........... H04M 3/5158; H04M 3/5232; H04M 3/5183
USPC .................................... 379/266.07, 266.08
See application file for complete search history.

(56) References Cited

U.S. PATENT DOCUMENTS

5,963,635 A * 10/1999 Szlam .................. G06Q 30/016
                                                    379/216.01
6,285,752 B1    9/2001  Rice
(Continued)

*Primary Examiner* — Nafiz E Hoque
(74) *Attorney, Agent, or Firm* — Lewis Roca Rothgerber Christie LLP (57) ABSTRACT

A web-based solution through which business entities create and manage communications campaigns, such as campaigns that afford target recipients an opportunity to be connected to a third party call center. A web interface is provided to enable a business entity customer to create a set of one or more rules that, when triggered during the campaign, cause the solution to take certain control actions in real-time, based on campaign performance. Preferably, this campaign performance is measured indirectly, i.e. without requiring a direct connection to an on-premises call center ACD. The interface provides the business entity customer with a convenient and easy-to-use display that identifies any rule that has been (or may be getting ready to be) triggered, together with a then current status of the campaign. The system takes a control action (e.g., campaign suspension, adjusting an outbound call rate, or the like) when a customer-configurable rule is triggered.

20 Claims, 6 Drawing Sheets

(51) Int. Cl.
*H04M 3/523* (2006.01)
*H04M 3/493* (2006.01)

(56) References Cited

U.S. PATENT DOCUMENTS

| | | |
|---|---|---|
| 6,363,145 B1 | 3/2002 | Shaffer et al. |
| 6,542,156 B1 | 4/2003 | Hong et al. |
| 6,621,900 B1 | 9/2003 | Rice |
| 6,825,861 B2 * | 11/2004 | Wasko ............... G06F 3/04817 715/835 |
| 6,954,731 B1 | 10/2005 | Montague |
| 6,961,419 B2 | 11/2005 | Power et al. |
| 6,980,640 B2 | 12/2005 | Rice |
| 8,379,834 B2 | 2/2013 | Weinstein et al. |
| 2003/0095652 A1 | 5/2003 | Mengshoel et al. |
| 2003/0095862 A1 | 5/2003 | Kawanishi et al. |
| 2005/0002515 A1 | 1/2005 | Mewhinney et al. |
| 2005/0065837 A1 | 3/2005 | Kosiba et al. |
| 2005/0066008 A1 | 3/2005 | Sikora et al. |
| 2006/0109975 A1 | 5/2006 | Judkins et al. |
| 2013/0156178 A1 | 6/2013 | Weinstein et al. |

* cited by examiner

AutoManage Alert Issues — 302
Last Modified: 20-Dec 8:18 AM

System Action: Adjust Call Rate — Notify

- ☑ Bad Number rate
  - Reduce [25] % after [100] failures representing [25] % of attempts ☐
  - Increase [10] % after [100] successes representing [95] % of attempts ☐
- ☑ Not Connected rate
  - Reduce [25] % after [100] failures representing [25] % of attempts ☐
  - Increase [10] % after [100] successes representing [98] % of attempts ☐

AutoManage Call Center Issues — 304

System Action: Adjust Call Rate — Notify

- ☑ Hold Time
  - Reduce [20] % after [5] calls avg. hold exceeds [60] seconds ☐
  - Increase [10] % after [5] calls avg. hold is below [30] seconds ☐
- ☑ Busy rate
  - Reduce [25] % after [3] failures representing [5] % of attempts ☐
  - Increase [10] % after [3] successes representing [98] % of attempts ☐
- ☑ No answer rate
  - Reduce [25] % after [10] failures representing [5] % of attempts ☐
  - Increase [10] % after [10] successes representing [98] % of attempts ☐
- ☑ Contact abandoned rate
  - Reduce [20] % after [5] failures representing [30] % of attempts ☐
  - Increase [10] % after [5] successes representing [80] % of attempts ☐
- ☑ Error rate
  - Reduce [25] % after [10] failures representing [15] % of attempts ☐
  - Increase [10] % after [10] successes representing [92] % of attempts ☐

System Action: Pause Sub-Campaign — Notify

- ☑ Hang up rate — Pause after [3] failures representing [15] % of attempts ☑
- ☑ Bad Number rate — Pause after [3] failures representing [10] % of attempts ☑
- ☑ Direct Connect fail rate — Pause after [10] failures representing [90] % of attempts ☑

[ Save Changes to Account ] [ Reset ]

| | | Manage | Setup | Profile | AutoManage | Actions |
|---|---|---|---|---|---|---|
| | | | | | Hide Inactive Issues | Change Rules |

System Action: Adjust Call Rate Reset    Last: 2.5m   Direct Connect Attempts: 3

| ✓ Issue | Status | Actual | | Threshold |
|---|---|---|---|---|
| ✓ Hold Time | ○●○ | 69.44s | 5 | 60s |
| ✓ Contact abandoned rate | ○●○ | 0   0.00% | 5 | 15% |
| ✓ No Answer rate | ●○○ | 0   0.00% | 10 | 5% |
| ✓ Error rate | ●○○ | 0   0.00% | 10 | 15% |
| ✓ Busy rate | ●○○ | 0   0.00% | 3 | 5% |

System Action: Pause Sub-Campaign    Last: 15.1m   Direct Connect Attempts: 15

| ✓ Issue | Status | Actual | | Threshold |
|---|---|---|---|---|
| Hang up rate | ●○○ | 0   0.00% | 3 | 30% |
| Bad Number rate | ●○○ | 0   0.00% | 3 | 20% |
| Direct Connect fail rate | ●○○ | 1   6.67% | 10 | 60% |

< Back

METHOD AND SYSTEM FOR MANAGING INTERACTIVE COMMUNICATIONS CAMPAIGNS

CROSS-REFERENCE TO RELATED APPLICATIONS

This application is a continuation of U.S. patent application Ser. No. 14/678,893, filed on Apr. 3, 2015, now issued as U.S. Pat. No. 9,219,817, which is a continuation of U.S. patent application Ser. No. 13/769,417, filed on Feb. 18, 2013, now abandoned, which is a continuation of U.S. patent application Ser. No. 11/336,151, filed on Jan. 21, 2006, now U.S. Pat. No. 8,379,834, the disclosures of which are incorporated herein by reference.

BACKGROUND OF THE INVENTION

1. Technical Field

The subject matter herein relates generally to methods of and systems for managing interactive communication campaigns over a computer network, such as the Internet.

2. Description of the Related Art

It is known in the prior art to provide a web-based hosted solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("customers") that desire to use the service typically register and access the service through an on-line (e.g., web-based) portal. In one representative use scenario, the managed service provider entity provides outbound telemarketing services on behalf of participating customers. The campaign typically is provisioned by the customer. Thus, for example, using a web-based interface, a participating customer defines a script for the campaign, imports a set of contacts, and defines one or more parameters that govern how the campaign is to be run. At a designated time, the service provider initiates the campaign, e.g., by providing the contacts to a set of telephone servers that set-up and manage the telephone calls to the targets of the campaign. During a given outbound call, as noted above, a recipient may be afforded an option to connect to a third party contact center, e.g., to speak to the customer representative. In such implementations, the hosted solution typically is integrated directly with the call center's on-premises automatic call distributor (ACD). The direct connection is used by the hosted solution to obtain information about contact center performance that, in turn, may be used to adjust one or more service parameters.

While having a direct connection between the hosted solution and the call center ACD may appear to be desirable, it significantly increases the time needed to deploy the managed service, and it presents complex and sometimes costly integration and operational issues.

BRIEF SUMMARY OF THE INVENTION

This disclosure describes a web-based hosted solution (a managed service or system) through which business entities create and manage communications campaigns, such as interactive campaigns that afford target recipients an opportunity to be connected to a third party call, center. A web interface is provided to enable a business entity customer to create a set of one or more rules that, when triggered during the campaign, cause the managed system to take certain control actions in real-time, based on campaign performance. As compared to the prior art, this "campaign performance" is measured indirectly, i.e. without requiring a direct connection to an on-premises call center ACD. Rather, preferably all information about the call center's performance during the campaign is derived from information (gathered by the hosted solution) about calls delivered, or attempted to be delivered, to the call center. In effect, the call center performance is inferred, and this performance is then exposed to the business entity customer through a web-based interface. In particular, the interface provides the business entity customer with a convenient and easy-to-use display that identifies any rule that has been triggered, together with a then current status of the campaign. The system is programmed to take a given control action (e.g., campaign suspension, adjusting an outbound call rate, or the like) when a customer-configurable rule is triggered. Thus, in one representative example, the system, recognizing that a hang-up rate at the call center has reached a customer-configurable threshold, suspends the campaign. In another example, the system recognizes that the rate of calls being answered by the call center has reached a threshold; as a result, the outbound call rate is adjusted. The customer display provides the status, preferably using a "traffic light signal" metaphor, with a green light representing that calls are currently within an established range, a yellow light representing that a call rate is being actively managed (e.g., the rate has been adjusted in response to a rule's threshold being reached or exceeded), and a red light indicating that a campaign has been paused. In either case, the system preferably makes these adjustments and displays the current status information without actually having a view into what resource or other issues might be impacting the call center's performance. In addition, the system may be programmed to provide the business entity customer with a notification (e.g., an email or other alert) whenever a rule that it has defined has been occurred.

According to another feature, the system optionally uses historical call rates to prime a call rate engine before initiating a current call campaign.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

Figure 1:
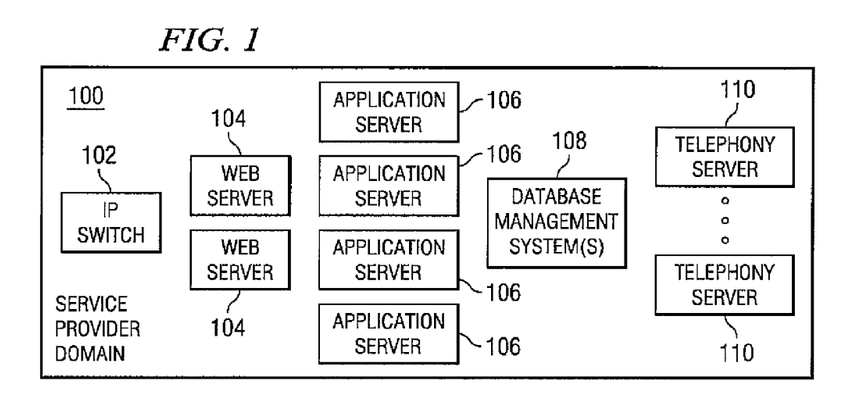
FIG. 1 is a block diagram of a service provider infrastructure for implementing a managed communications campaign service according to the present invention.

FIG. 1 illustrates a representative service provider or system architecture, which in the preferred embodiment is implemented in or across one or more data centers. A data center typically has connectivity to the Internet. The system provides a web-based hosted solution through which business entities create and manage communications campaigns, Campaigns may be interactive or non-interactive, Representative campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to call center campaigns, appointment reminder campaigns, welcome call campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, and the like. The particular type of campaign is not a limitation or feature of the invention.

A business entity user has a machine such as a workstation or notebook computer. Typically, a business entity user accesses the service provider architecture by opening a web browser on the machine to a URL associated with a service provider domain. The user then authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 8.1. The database management system 108 may be implemented as an Oracle database management package running on Solaris. A representative telephony server machine is an application server having one or more PSTN, VoIP and/or voice processing cards that provide interconnectivity for telephone-based calling applications. A representative card is a CG 6000 (or variant) series available from NMS Communications, Inc. Typically, a voice processing card has a given number (e.g., 4) T-1 lines connected thereto. In a high volume call environment, there may be several web server machines, several application server machines, and a large number of telephony server machines. Although not shown in detail, the infrastructure may include a name service, other load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle all telephony-related functions including, without limitation, executing outbound calls and forwarding calls to a contact center. The particular hardware and software implementation details described herein are merely for illustrative purposes are not meant to limit the scope of the present invention.

The contact center typically is owned, operated or managed by a third party, although this is not a requirement. A representative contact center is a third party call center having automatic call distribution (ACD) functions. Such technologies are well-known and are outside the scope of the present invention.

Figure 2A:
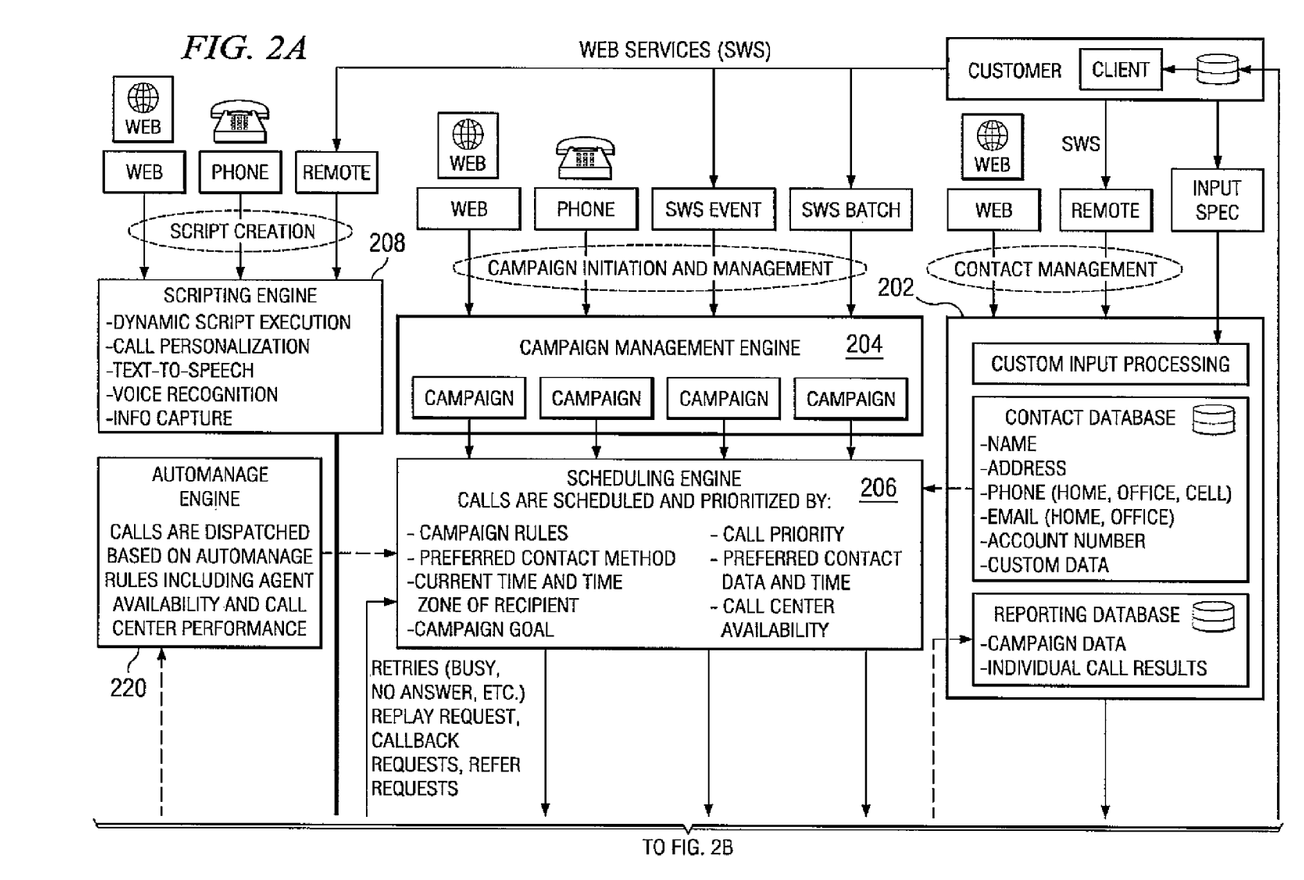
FIGS. 2A-2B illustrate how an interactive communications campaign is created and managed in the service provider infrastructure illustrated in FIG. 1.
Figure 2B:
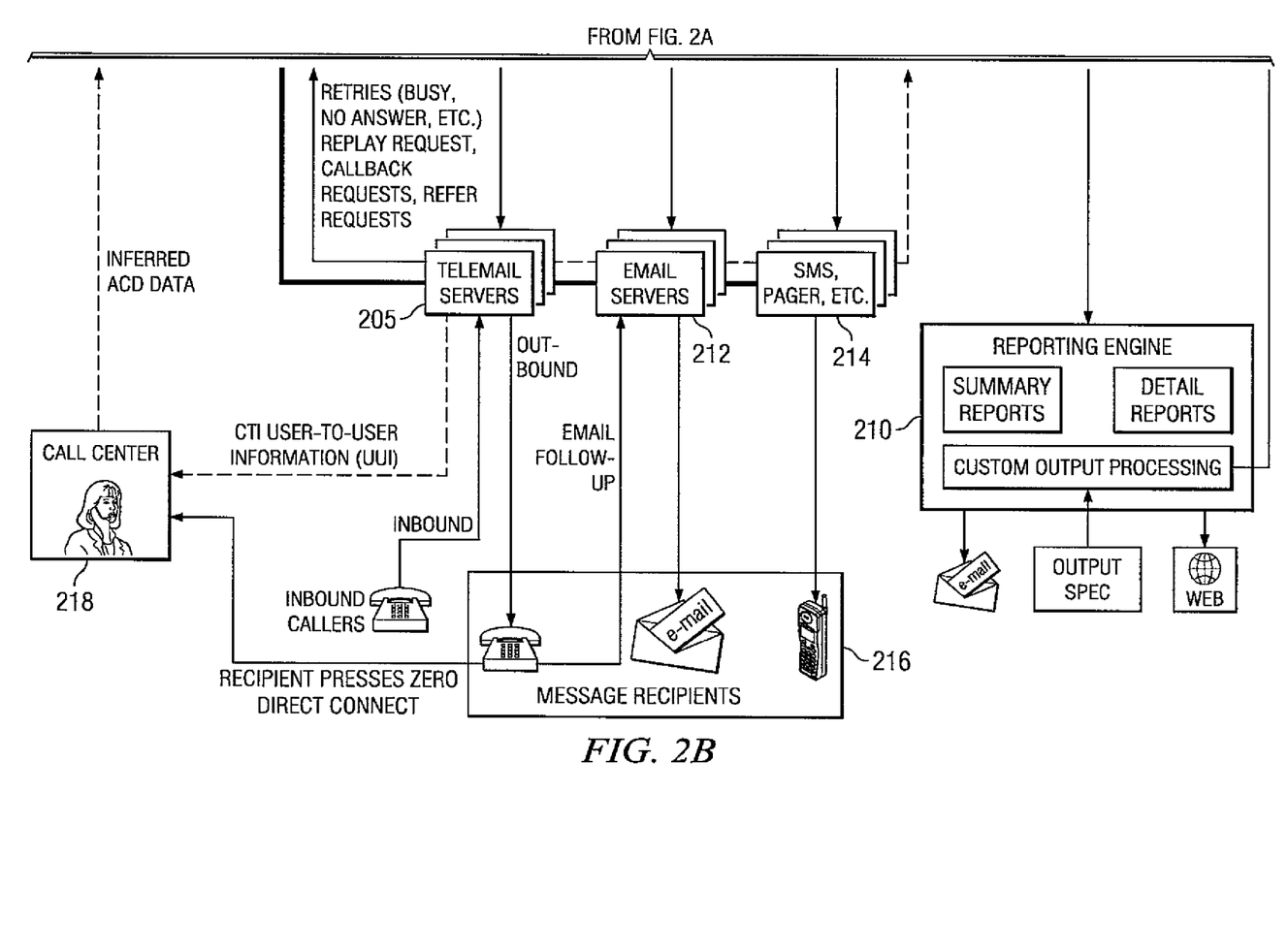

Using the service provider infrastructure, a business entity can create, execute and manage a campaign. Typically, a campaign is a complete series of calls to a contact list using one or more sub-campaigns that use a given script. A sub-campaign typically is a single pass of calls through a contact list. A script is what determines what will happen during a phone call. Typically, a script is formatted as XML and specifies a sequence of audio prompts that are played and what happens when the recipient takes certain actions such as pressing a button on the phone or speaking a response. A campaign need not comprise one or more sub-campaigns, but may simply comprise a single set of calls on a contact list. One or more contact lists are stored in a contact database, and typically a contact list comprises a set of contacts. A contact typically is an individual in the contact database. A contact can include home, work or cell numbers, a client identifier, an email address, or the like. Also, contacts typically include first name, last name, company and other information. With reference to FIGS. 2A-2B, a business entity connects to the service provider, authenticates, and then uses one or more applications to create; execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP) to the system by or on behalf of the business entity. The scripting engine 208 handles the creation and managing of the campaign scripts, using instructions entered by or on behalf of the business entity via a web-based interface. The campaign management engine 204 manages the campaign by interoperating with the scheduling engine 206, which in turn interoperates with the telephony servers 205 to execute the campaign. The business entity can evaluate or monitor the campaign from summary, detail and/or custom reports generated by a reporting engine application 210. Notification campaigns are executed using email servers 212 and SMS (or MMS) servers 214.

Figure 6:
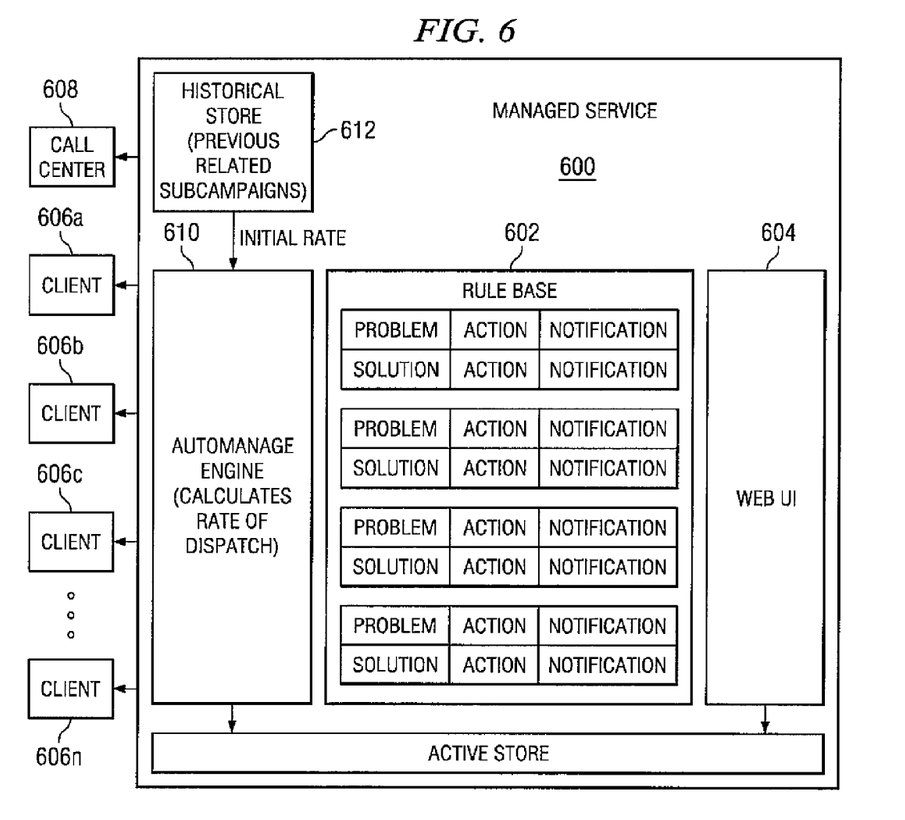
FIG. 6 is a block diagram illustrating the rules-based management engine of the present invention.

As also illustrated in FIGS. 2A-2B, after connecting an outbound call to a target recipient 216, the recipient may elect to be connected to the contact center 218 (typically a third party call center). According to a feature of this disclosure as will be described, the system obtains information about the contact center's performance during a given communications campaign, preferably without requiring a direct connection between the infrastructure and a contact center's on-premises ACD. This enables the managed service provider to integrate with both its business entity customers and with their associated contact center environments rapidly and efficiently. As will be seen, the interconnectivity between the managed service provider and the contact center is "inferred" from how calls that originate from the service provider to the target recipients (who have expressed an interest in being connected to the contact center) are actually handled. This "indirect" connectivity is illustrated in FIG. 2 by the "AutoManage™ engine" 220. AutoManage™ is a service mark of Soundbite Communications, Inc., the assignee of this application. It is used here merely as a shorthand reference to the basic functionality, which can be provided in software as a set of software instructions executable on a processor. FIG. 6 illustrates the function of the engine in more detail. In particular, as seen there, the managed service infrastructure 600 comprises a rule base 602 that is defined through the web interface 604 by the one or more business entities 606a-n. One or more call centers 608 are associated with the managed service. A historical data store 612 stores the call rates that were generated as a result of one or more campaigns or sub-campaigns. The AutoManage engine (reference numeral 220 in FIGS. 2A-2B and reference number 610 in FIG. 6) is responsible for dispatching calls at an appropriate rate while ensuring that all customer-requested rule parameters (as described below) are honored. Examples of such parameters include: number of agents available at the call center, maximum hold time at the call center, client abandon rate prior to speaking to a call center, number of bad numbers reached on the outbound dial, and so forth. Generally, for a given customer campaign or sub-campaign, the engine 220 decides on an initial call dispatch rate based on the customer-requested parameters (and, optionally, on historical data from like campaigns or sub-campaigns). Once the campaign or sub-campaign, as the case may be, starts running, the engine 220 monitors the parameters and ensures that they remain within tolerance. If an identified parameter exceeds the customer-defined value, then a system action rule (e.g., adjusting the call dispatch rate, suspending the calls, or the like) is applied and any customer notification requested is issued. Preferably, once a Problem rule has fired, the engine 220 continues to monitor the parameter and periodically either additionally reapplies the Problem rule (if the problem persists) or applies a Solution rule if the problem appears to be rectified. A Problem rule in this context means that the call rate is being adjusted downward (to slow the campaign), and a Solution rule means that the call rate is being adjusted upward (to speed up the campaign, typically after a Problem rule has been applied).

The use of historical call rate adjustment information to "prime" the AutoManage engine for a current campaign or sub-campaign is not required but provides improved performance. Using this technique, the system provides more stable initial operation, as well as improved dynamic response to changing conditions during the campaign.

Figure 3:
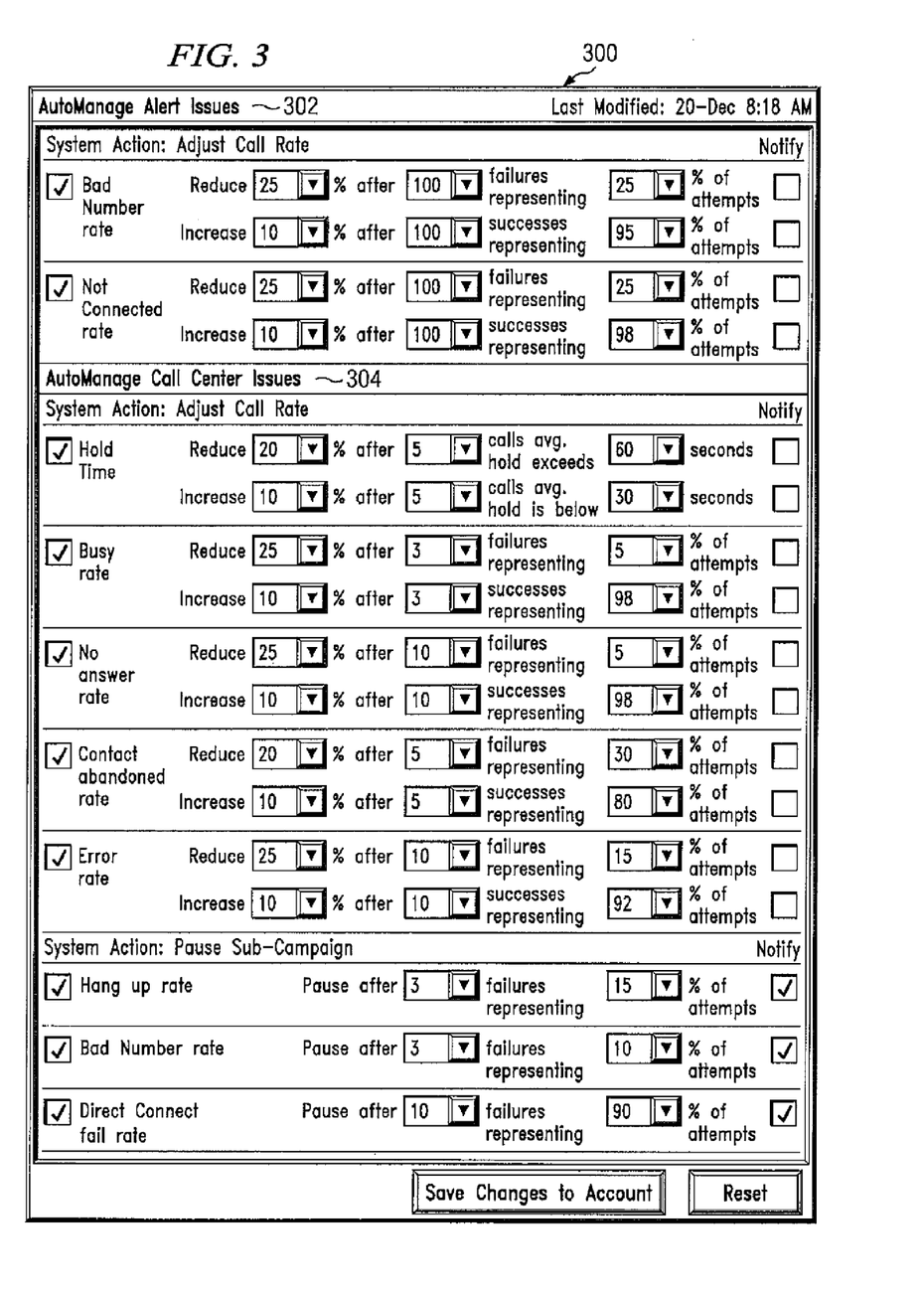
FIG. 3 illustrates a web page that is exported to a business entity by the service provider infrastructure to enable the business entity to define a set of one or more default rules that are used by one or more sub-campaigns.

According to this disclosure, a web-based interface is provided to enable a business entity customer to create a set of one or more management rules that, when triggered during the campaign, cause the infrastructure (and, in particular, certain control applications therein) to take certain control actions in real-time, preferably based on campaign performance. The following provides additional details regarding this rule definition feature, sometimes referred to herein as AutoManage.™ In particular, FIG. 3 illustrates a representative web page 300 that is served to a business entity by the service provider infrastructure to enable the business entity to define a set of one or more default rules that are used in a campaign (comprising one or more sub-campaigns). The particular layout and format of the page is not meant to be taken to limit the scope of the present invention. In this embodiment, the page 300 is separated into two (2) primary sections; an Alert Issues section 302, and a Call Center Issues section 304. As can be seen, one or more "rules" are associated with each section, and each rule is defined by one or more control parameters that are configurable using a set of associated drop boxes. Any other convenient GUI technique (fill-in fields, selectable radio buttons, or the like) may be used to define the rule parameters. Each rule also has associated System Action, which is a high level action that is implemented when the rule is triggered. In this embodiment, when Alert Issue rules are triggered, the associated System Action is an adjustment of a call rate. When certain Call Center rules are triggered, the associated System Action is an adjustment of a call rate; when certain other Call Center rules are triggered, the associated System Action pauses or "suspends" the campaign or sub-campaign.

Thus, an illustrated Alert Issue rule is a Bad Number rate, which is the number of incidents the system detects a bad or invalid number when attempting to contact to the call center. In this example, the user has configured the Bad Number rate rule to reduce the call rate by 25% if at any time 100 out of the last 400 call attempts (25%) fail to connect due to a bad (invalid) phone number; conversely, the call rate is increased by 10% whenever 100 out of the last 105 call attempts (>95%) successfully connect to a valid phone number. Of course, these are merely representative settings, Another Alert Issue rule is a Not Connected rate rule, and various default values for this rule are also illustrated. A representative Call Center Issue rule is Hold Time, which is the average time that recipients are on hold at the call center. In this example, the user has configured the rule to reduce the outbound call rate by 20% whenever the average hold time for the 5 most recent inbound calls exceed 60 seconds. For example, if the last 5 inbound calls are put on hold by the call center for 45, 80, 75, 50 and 70 seconds, respectively, the average hold time is 64 seconds, and (in this example) the outbound call rate would be adjusted down by 20%. Conversely, with the illustrated settings, the outbound call rate is increased by 10% whenever the average hold time for the previous 5 inbound calls drops below 30 seconds. For example, if the hold time for the last 5 callers is 20, 0, 40, 20 and 10 seconds, respectively, the average is 18 seconds, and (in this example) the outbound call rate would be increased by 10%. Once again, these are merely illustrative settings, Other Call Center Issue rules are illustrated as well, and these include a Busy Rate rule (a number of incidents that a Busy rate was detected by the system when attempting to connect to the call center), a No answer rate rule (a number of incidents that no answer was detected by the system when attempting to connect to the call center), a Contact abandoned rate rule (a number of incidents that the recipient (the contact) hangs up during hold), and an Error rate rule (a number of incidents that telephony errors were detected by the system when attempting to connect to the call center). The Call Center Issue rules that trigger a pause or suspension of the campaign or sub-campaign include a Hang-up rate rule, which represents a number of incidents that the call center hangs up on recipients while the recipient is still on hold. In this example, the user has set a default that pauses outbound calling whenever the call center hangs up on 3 of the last 20 inbound callers (15%). Representative rule parameters for a Bad number rate and direct connect fail rate are also provided, once again by example only. The Bad number rate is a number of incidents the system detects a bad or invalid number when attempting to connect to the call center, and the direct connect fail rate comprises an aggregate set of failures when attempting to connect to the call center.

As also illustrated in FIG. 3, if a Notify option is checked for a given rule, an email (or other) notification is sent when the threshold for that rule is reached. To enable a rule, the user selects a checkbox for the rule located to the left of the rule name. The user can click the Save Changes to Account button to save the rules as a default set.

Figure 4:
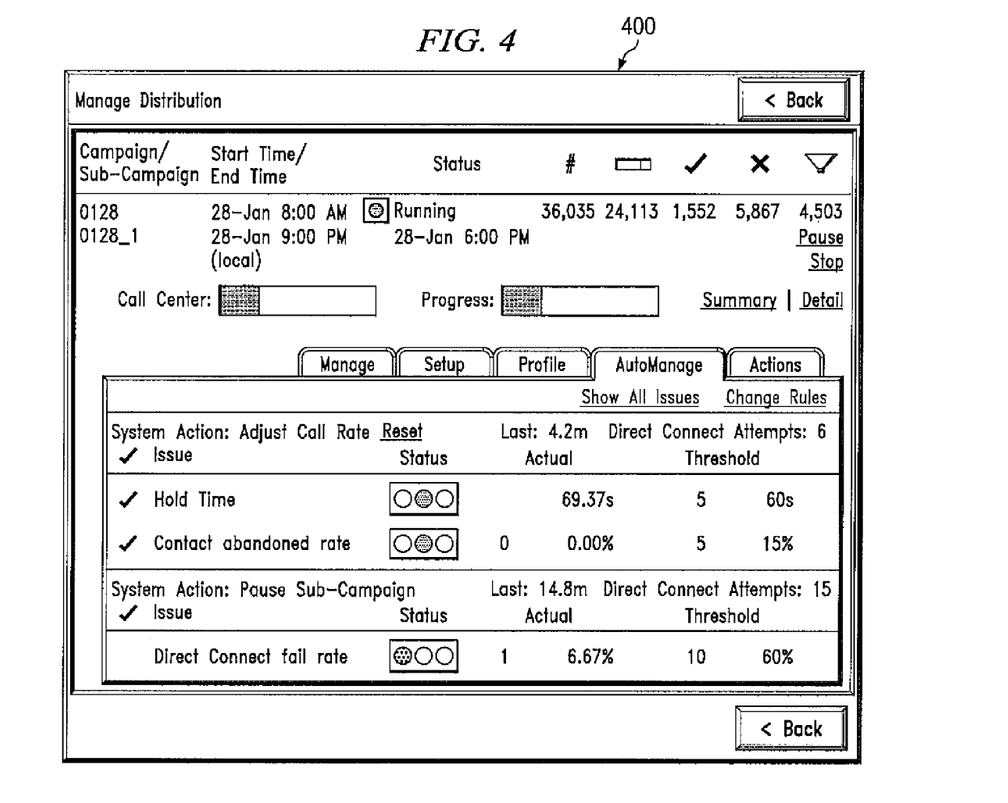
FIG. 4 illustrates a web page that is exported to a business entity by the service provider infrastructure to enable the business entity to monitor the progress of issues that have been specified by the rules using the display interface of FIG. 3.

It is now assumed that a campaign or sub-campaign for a particular business entity that has specified a set of rules is in progress. The business entity user can then use the web interface to monitor the progress of issues that have been specified by these rules. FIG. 4 illustrates a representative web page 400 that is served to the business entity user by the service provider infrastructure. Once again, the particular layout and format of the page is not meant to be taken to limit the scope of the present invention. As noted above, the management rules (e.g., specified using the GUI in FIG. 3) cause the system to take certain actions in real-time, based on campaign performance as measured indirectly, namely, through the various rules that have been described. The service provider adjusts calling rates or suspends the campaign or sub-campaign, as the case may be, by applying one or more call center performance metrics (Hold Time, Contact abandoned rate, No Answer rate, Error rate, Busy rate, Hang up rate, Bad Number rate, Direct connect fail rate), as opposed to having actual ACD statistics. As described, the management rules can increase and decrease the flow of calls depending upon various behaviors or, in some cases, can suspend the campaign.

The web page 400 displays active issues. An issue is considered to be active if the system has adjusted the calling rate or paused calls altogether within a given past time period (e.g., 15 minutes) because the threshold for that issue's rule has been reached or exceeded. An issue may also be considered active if there is any system activity for a given issue, e.g., if there is a single incident of a direct connect fail rate the page will display a "1" next to that issue. The checks to the left of the issue indicate that a rule has been enabled for the particular issue; likewise, if a rule is not enabled, preferably there will not be a check displayed next to the issue.

In this example screen, preferably there are two categories of Active issues:
   Adjust Call Rate—issues for which the system action is to adjust the calling rate. Under the Status for Adjust Call Rate, a green or a yellow light is displayed for each issue.
   Pause Call Rate—issues for which the system action is to pause a sub-campaign. Under the Status for Pause Sub-Campaign, a green or red light is displayed for each issue.
Preferably, yellow or red lights are also displayed under Status while a sub-campaign is running so that the user can quickly identify if there is an issue with a sub-campaign. As can be seen, in this example, there are four column headings on the display tab, which are explained below:
   Issue The specific issue's rule that caused the calling rate to be adjusted.
   Status Shows whether the issue is currently in a green, yellow, or red state of alert (preferably updated in real time).
      Green—calls are currently within the pre-established threshold
      Yellow—the system is actively managing the call rate (e.g., has adjusted the calling rate downward in response to the rule's threshold being exceeded, or is adjusting it upward following some downward adjustment)
      Red—the threshold has been exceeded and the sub-campaign has been paused.
      Although the traffic light display icon metaphor is preferred, other display icons (e.g., having first, second and third states) can be used
   Actual The actual number of calls that encountered an issue, as a numeric value and as a percentage of total calls. Preferably, a percentage is calculated as a number of actual incidents divided by a number of direct connect attempts.
   Threshold The threshold that was set for the issue's rule. If an issue has been in a normal state for more than a given time period (e.g., 15 minutes), preferably the rule disappears from this page. Preferably, this information does not change unless the settings for the rule change.
Preferably, Reset and Resume links may appear on the page if the system has adjusted the calling rate in reaction to a rule surpassing its threshold. If the Reset link appears to the right of Adjust Call Rate, it indicates the calling rate has been adjusted: if the Resume link appears to the right of Pause Sub-Campaign, it indicates the calls have been paused. When the user selects either Reset or Resume, the issue clears and, in the case of Resume, calls resume. Also, if calls have been paused by the system, the user can click Resume on the page to resume calling.

Figure 5:
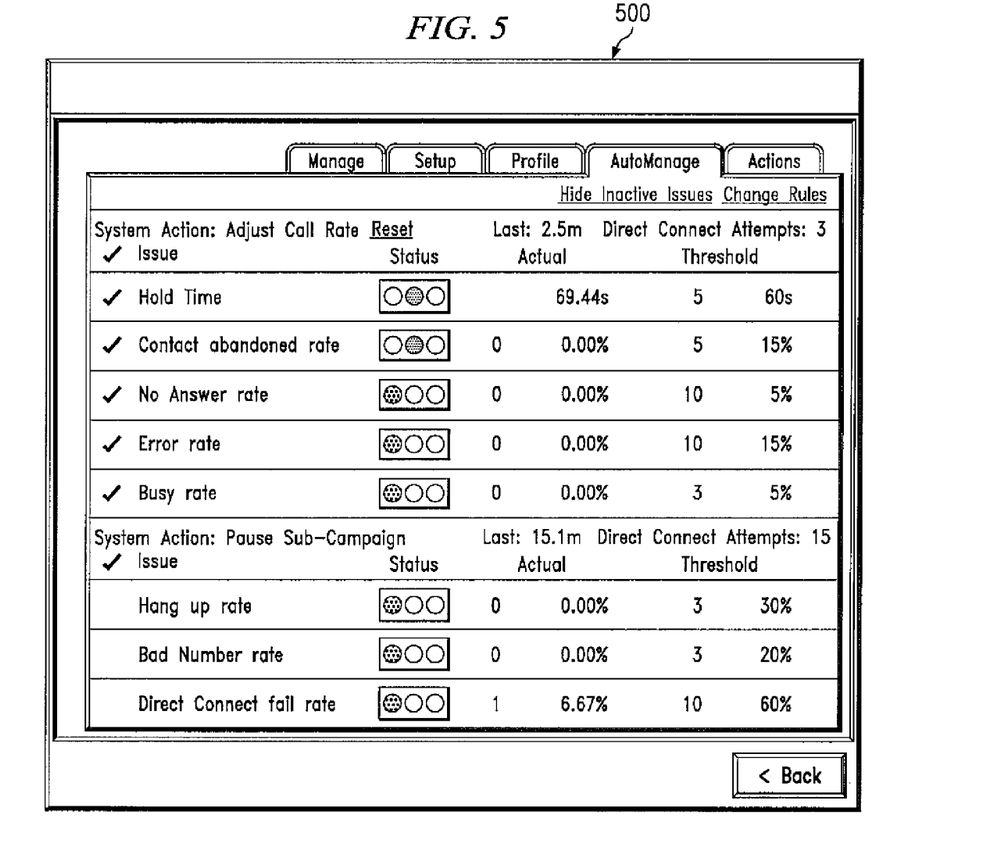
FIG. 5 illustrates the web page in FIG. 4 after a user has selected a Show All Issues link.

If the user desires to view not only which issues have been recently active but all issues, he or she can click Show All Issues. In such case, preferably the text "Show All Issues" changes to "Hide Inactive Issues." FIG. 5 illustrates a representative Show All Issues page.

The system preferably adjusts outbound call rates on a sub-campaign-by-sub-campaign basis. The particular algorithm used to adjust an outbound call rate may vary, but one representative technique determines a target dispatch rate by taking into consideration such factors as a percentage of recipients who are likely to elect to connect to the call center, a service time of those recipients who do connect to the call center, and the service time of those recipients who do not connect to the call center. These values may be calculated over a time window. The target dispatch rate may then be calculated periodically based on a then-current target dispatch rate and a number of agents currently available to the system.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. As illustrated in FIG. 1, the present invention may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described our invention, what we now claim is set forth below:

1. An apparatus comprising:
   a set of machines each comprising a processor, and a memory holding program instructions that are executed by the processor;
   one or more web servers executing on the machines and configured to enable a plurality of business entities to each create an interactive communications campaign, each campaign including a set of one more rules that may be triggered during the campaign;
   a telephony server, executing on one of the machines, configured to initiate outbound calls to recipients over a plurality of voice connections during the campaign for a respective one of the business entities, and to offer an option to a recipient of an outbound call to connect, via a voice connection through the telephony server, to a third party contact center having an automatic call distributor (ACD); and
   an application server executing on one of the machines (i) to monitor the voice connections through the telephony server as the campaign for a respective one of the business entities is executed to infer a contact center performance metric, wherein the contact center performance metric is inferred without requiring a direct data connection from the ACD of the third party contact center, (ii) to evaluate the contact center performance metric to determine whether a rule from the set of one or more rules has been triggered, (iii) to take a given action if the rule has been triggered, and (iv) to provide information identifying the rule, together with a status of the given campaign;
   at least one of the web servers being further adapted to serve a web page to the respective business entity, the web page identifying the status of campaign as determined by the application server.

2. The apparatus of claim 1, wherein the status is a display icon having at least first and second states.

3. The apparatus of claim 2, wherein, with respect to a given contact center performance metric, the first state indicates that a rule from the set of rules has been triggered, and the second state indicates that a rule has been triggered that has caused an adjustment to the campaign.

4. The apparatus of claim 1, wherein the application sever updates the information identifying the rule and the status of a campaign.

5. The apparatus of claim 1, wherein the given action comprises adjusting a call rate for the campaign.

6. The apparatus of claim 1, wherein the contact center performance metric comprises a call failure rate.

7. The apparatus of claim 1, wherein the given action comprises suspending the campaign.

8. An apparatus comprising:
   a processor; and
   a memory coupled to the processor, wherein the memory stores instructions that, when executed by the processor, cause the processor to:
   receive information regarding an interactive communications campaign, the information comprising a plurality rules that may be triggered during the interactive communications campaign;
   initiate outbound calls to recipients of the interactive communications campaign over a plurality of voice connections during the interactive communications campaign;
   offer an option to a recipient from among the recipients to connect, by way of a voice communication channel, to a third party contact center having an automatic call distributor (ACD);
   monitor the voice connections to infer a contact center performance without requiring a direct data connection from the ACD of the third party contact center;
   determine whether or not a rule from the plurality of rules is triggered based on the contact center performance;
   take a given action in response to the rule being triggered; and
   transmit a signal to display information identifying the rule and a status of the campaign on a display of a device accessible to an entity associated with the third party contact center.

9. The apparatus of claim 8, wherein the status is a display icon having at least first and second states.

10. The apparatus of claim 9, wherein the first state indicates that a rule from the set of rules has been triggered, and the second state indicates that a rule has been triggered that has caused an adjustment to the campaign.

11. The apparatus of claim 8, wherein the instructions further cause the processor to update the information identifying the rule and the status of a campaign.

12. The apparatus of claim 8, wherein the given action comprises adjusting a call rate for the campaign.

13. The apparatus of claim 8, wherein the contact center performance metric comprises a call failure rate.

14. The apparatus of claim 8, wherein the given action comprises suspending the campaign.

15. An method comprising:
   receiving, by a processor, information regarding an interactive communications campaign, the information comprising a plurality rules that may be triggered during the interactive communications campaign;
   initiating, by the processor, outbound calls to recipients of the interactive communications campaign over a plurality of voice connections during the interactive communications campaign;
   offering, by the processor, an option to a recipient from among the recipients to connect, by way of a voice communication channel, to a third party contact center having an automatic call distributor (ACD);

monitoring, by the processor, the voice connections to infer a contact center performance without requiring a direct data connection from the ACD of the third party contact center;

determining, by the processor, whether or not a rule from the plurality of rules is triggered based on the contact center performance;

taking, by the processor, a given action in response to the rule being triggered; and transmitting, by the processor, a signal to display information identifying the rule and a status of the campaign on a display of a device accessible to an entity associated with the third party contact center.

16. The method of claim 15, wherein the status is a display icon having at least first and second states, wherein the first state indicates that a rule from the set of rules has been triggered, and the second state indicates that a rule has been triggered that has caused an adjustment to the campaign.

17. The method of claim 8, wherein the instructions further cause the processor to update the information identifying the rule and the status of a campaign.

18. The method of claim 8, wherein the given action comprises adjusting a call rate for the campaign.

19. The method of claim 8, wherein the contact center performance metric comprises a call failure rate.

20. The method of claim 8, wherein the given action comprises suspending the campaign.

* * * * *